United States Patent [19]

Iwamoto et al.

[11] 4,378,452
[45] Mar. 29, 1983

[54] METHOD OF MANUFACTURING RUBBER MODIFIED STYRENE RESINS

[75] Inventors: Mune Iwamoto; Norifumi Ito; Yuzuru Ishida; Tetsuyuki Matsubara, all of Yokohama, Japan

[73] Assignee: Mitsui Toatsu Chemicals, Inc., Tokyo, Japan

[21] Appl. No.: 269,011
[22] PCT Filed: Oct. 30, 1980
[86] PCT No.: PCT/JP80/00270
 § 371 Date: Jul. 1, 1981
 § 102(e) Date: May 27, 1981
[87] PCT Pub. No.: WO81/01291
 PCT Pub. Date: May 14, 1981

[30] Foreign Application Priority Data
 Nov. 1, 1979 [JP] Japan .................. 54-140466

[51] Int. Cl.$^3$ .................................... C08F 279/02
[52] U.S. Cl. ........................ 525/263; 525/53
[58] Field of Search .............. 525/243, 316, 263

[56] References Cited
U.S. PATENT DOCUMENTS 3,903,202  9/1975  Carter .................................. 525/316
3,945,976  3/1976  McCurdy .......................... 525/316
4,012,462  3/1977  Chaudhary ...................... 525/243
4,187,261  2/1980  Slama ............................... 525/243
4,254,236  3/1981  Burk ................................. 525/316
4,255,315  3/1981  Anspon ........................... 525/243
4,282,334  8/1981  Walter ............................. 525/243

Primary Examiner—Paul R. Michl
Attorney, Agent, or Firm—Fisher, Christen & Sabol

[57] ABSTRACT

A method of manufacturing rubber modified styrene resins comprising the 1st step of polymerizing a styrene monomer in the presence of a butadiene polymer and an organic peroxide at the ratio of 100 parts by weight, 3 to 15 parts by weight and 0 to 0.01 parts by weight respectively until the polymerization yield of the styrene monomer becomes 2 to 5 time more than the weight of the butadiene polymer, and the 2nd step of polymerizing the full amount of polymer mixture from the 1st step and 0 to 200 parts by weight of the fresh styrene monomer in the presence of 0.01 to 0.9 parts by weight of the organic peroxide until the polymerization yield of the styrene monomer becomes at least 1.5 times more than that of the 1st step. The molded product of the resin thus obtained shows an improved impact strength at the portions wherein polystyrene molecule orientation tends to occur.

10 Claims, No Drawings

METHOD OF MANUFACTURING RUBBER MODIFIED STYRENE RESINS

TECHNICAL FIELD

The present invention concerns a method of manufacturing rubber modified styrene resins having an excellent impact resistance. More particularly, the present invention concerns a method of continuously manufacturing rubber modified styrene resins with a remarkably improved impact resistance at the portions where polystyrene molecule orientation tends to occur in the molded product.

Background of Art

In the conventional art, rubber modified styrene resins are manufactured by the continuous bulk polymerization or solution polymerization or by the batch type bulk-suspension polymerization method. There have been proposed various methods for continuously manufacturing rubber modified styrene resin in the art. One of the methods which uses organic peroxide is disclosed in Japanese Patent Publication No. 37233/1976. As the uses for rubber modified styrene resins are becoming more and more diversified and multiplied today, and the said resins are used as a material for complicatedly shaped molded products, an extremely important problem facing the industry concerned is to secure the impact strength at the portions where polystyrene molecule orientation tends to occur within the molded product.

In other words, the rubber modified styrene resins obtained by the conventional manufacturing method have the problem in that when molded into a complex shape certain portions tend to become destroyed by the impact caused by the crash of an object during actual use. When such a phenomenon of the destruction was studied, it was found that the portion in question coincided with the portion where orientation of the polystyrene molecules tended to occur, and judging from the results by the evaluation of falling weight impact test, the impact strength where polystyrene molecule orientation tended to occur in the molded product decreased inordinately.

Generally such a degree of orientation in the styrene resin molded product depends on the molding conditions, but it may also be improved by the manufacturing method of the resin itself.

The object of the present invention is to provide a method for manufacturing rubber modified styrene resin with an improved impact strength at the portions where polystyrene molecule orientation tends to occur in the molded product.

DISCLOSURE OF THE INVENTION

"The portions where polystyrene molecule orientation tends to occur in the molded product" as mentioned in the following discussion of the present invention coincide with the portions where excessive thermal contraction occurs at the time of heating (80°–120° C.) when the product is molded with polystyrene resins. The absolute amount of thermal contraction depends on the molding conditions, but it was found that the impact strength at the portions with a relatively larger degree of thermal contraction was uniquely lower in the molded product with a complex shape.

Surprisingly, if the resin was manufactured by the continuous polymerization method where organic peroxide, initiator for radical polymerization, was supplied under specifically restricted conditions, the impact strength was observed to improve greatly at the portions where polystyrene molecule orientation tended to occur in the molded product. The present invention was completed based on this finding.

According to the present invention, there is provided a method of manufacturing rubber modified polystyrene resins:

In a method of manufacturing rubber modified styrene resins from a styrene monomer and a butadiene polymer by bulk polymerization or solution polymerization method using an organic peroxide as an initiator, the improvement which comprises (A) the 1st step of polymerizing the styrene monomer in the presence of butadiene polymer and the organic peroxide at the ratio of 100 parts by weight, 3–15 parts by weight and 0–0.01 parts by weight respectively until the polymerization yield of the styrene monomer becomes 2 to 5 times more than the weight of the butadiene polymer; and (B) the 2nd step of polymerizing the full amount of polymerization mixture of the 1st step and 0–200 parts by weight of the styrene monomer in the presence of 0.01–0.9 parts by weight of the organic peroxide until the polymerization yield of the styrene monomer becomes at least 1.5 times more than that of the 1st step.

THE BEST MODE OF CARRYING OUT THE INVENTION

A preferred embodiment of the present invention for continuously manufacturing rubber modified styrene resins comprises the following: In a method of continuously manufacturing rubber modified styrene resins from a styrene monomer and a butadiene polymer by the solution polymerization or bulk polymerization method using an organic peroxide as an initiator for radical polymerization, the improvement comprising the steps of (A) using single or plural number of agitator type polymerization reactor connected in series, supplying 100 parts by weight of the styrene monomer and 3–15 parts by weight of the butadiene polymer to the 1st reactor which are to be supplied continuously per unit time, adding continuously the full amount of 0 to 0.01 parts by weight of organic peroxide to the 1st reactor or in divided portions to the plural number of polymerization reactors, and conducting polymerization until the polymerization yield to the styrene monomer becomes to the range of 2.0 to 5.0 times more than the weight of the butadiene polymer in the final reactor (hereinafter referred to as the step (A); and (B) using a single or a plural number of reactors arranged in series, supplying continuously to the reactor in the 1st stage (a) the full amount of polymerization liquid discharged from the step (A), (b) 0–200 parts by weight per unit time of the fresh styrene monomer, and (c) 0.01–0.9 parts by weight of the organic peroxide, and conducting polymerization until the total polymerization yield of the styrene monomer becomes at least 1.5 times more than that of the step (A) in the final stage (hereinafter referred to as the step (B)).

The total amount of an organic peroxide to be added as an initiator for radical polymerization in the step (A)

of the present invention is set to be less than 0.01 parts by weight (include 0), and more preferably 0.003 parts by weight, for 100 parts by weight of styrene monomer supplied to the 1st reactor in the step (A). If the amount exceeds 0.01 parts by weight, effects of the present invention are not to be achieved. When the resin manufactured by adding an organic peroxide in an amount exceeding 0.01 parts by weight is electron-microscopically observed, numerous rubber particles having a finer diameter than those of the resin manufactured according to the present invention method are observed. Formation of such particles seems to hinder manifestation of the advantages of the present invention. To the 1st reactor of the step (A), a butadiene polymer is added in a range of 3 to 15 parts by weight, and more preferably in the range of 4–12 parts by weight, for 100 parts by weight of styrene monomer. According to the method of the present invention, formation of rubber dispersing particles occurs in the step (A) as is also well known in the art. Outside the range of 3–15 parts by weight, diameter modification of the dispersing particles becomes difficult, the rubber particle diameters within the product resin fluctuate during the manufacturing operation, and it becomes difficult to obtain a product with a stable quality.

The reason why one or more agitator type polymerization reactors connected in series are used in the step (A) as the polymerization reactor in the present invention method is to facilitate the above mentioned dispersing particle formation. The number of such agitator type polymerization reactors may be one or more, and there is no specific limitation placed on the said number. Polymerization of a styrene monomer in the step (A) is conducted in the final reactor of the step (A) (the polymerization reactor in the step (A) if only one polymerization reactor is used) until the total polymerization yield of the styrene monomer is in the range of 2.0 to 5.0 times more than the amount of a butadiene polymer supplied, or more preferably in the range of 2.3 to 3.5 times. If it is less than 2.0 times, or more than 5.0 times, the advantages of the present invention are not manifested. The present invention method provides the step (B) where organic peroxide is supplied to a polymerization solution in such a specific state to continue polymerization.

In the step (B) of the present invention, there are supplied the full amount of the polymerization liquid discharged from the step (A) and 0–200 parts by weight per unit time, or more preferably 0–150 parts by weight, of the fresh styrene monomer to the first reactor vessel of the step (B). This supply of the styrene is useful in adjusting the rubber content in the product resin. When the supply exceeds 200 parts by weight, dispersion stability of rubber particles formed in the step (A) becomes deteriorated, and adjustment of rubber particle diameter becomes difficult.

In the step (B) of the present invention method, 0.01–0.9 parts by weight per unit time of an organic peroxide for 100 parts by weight per unit time of the styrene monomer supplied to the 1st reactor in the step (A) must be supplied to the reactor in the 1st stage of the step (B). We shall further explain the amount of the organic peroxide to be supplied. When the sum of the amount of the unreacted styrene monomer in the polymerization liquid formed in the step (A) to be supplied to the reactor in the 1st stage of the step (B) per unit time and the amount of the styrene monomer to be freshly supplied per unit time to the reactor in the 1st stage of the step (B) is set at 100 parts by weight, then the amount of the organic peroxide to be supplied should be selected to be within the range of 0.009 to 0.31 parts by weight per unit time, or more preferably in the range of 0.01 to 0.2 parts by weight. The figures are significant in that the effects of the present invention are not achieved with less than 0.009 parts by weight of the organic peroxide. This is presumably because a certain reaction product is formed by a certain amount of the organic peroxide supplied in the step (B), and such a reaction product works specifially on the butadiene polymer converted to a specific state in the step (A), thereby bringing about the effects of the present invention. If the addition amount exceeds 0.31 parts by weight, Izod Impact value of the product resin becomes lowered, and there arises difficulties to its performance as an impact resistant resin. When the organic peroxide is to be supplied also in the step (A), it does not matter whether the types of the organic peroxides used in the steps (A) and (B) are the same or different. This range of 0.009–0.31 parts by weight is so set in the present invention because the polymerization yield of the styrene monomer in the step (A) is controlled by the weight of rubber, and also because the polymerization yield in the step (B) should be 1.5 times or more than that in the step (A), thus placing a limitation on the amount of the styrene monomer to be supplied in the step (B). Therefore, the latter is limited to be within the range of 0.01–0.9 parts by weight for 100 parts by weight of the styrene monomer supplied in the step (A).

The polymerization yield of the styrene monomer in the step (B) should be at least 1.5 times more than that of the step (A), or more preferably more than 2 times. If it is less than 1.5 times, the advantages of the present invention are not achievable, presumably because the above mentioned organic peroxide does not become fully active. The organic peroxide is supplied to the steps (A) and (B) by dissolving in the styrene monomer to be fed, or in the solution of ethylbenzene or toluene, or by dispersing in a dispersing agent or fluidizing agent such as paraffin.

The organic peroxide used in the present invention may be any which has a function of initiating polymerization for a styrene monomer such as methylethyl ketone peroxide, 1.1-bis(t-butylperoxy)3.3.5-trimethylcyclohexane, 1.1-bis(t-butylperoxy)cyclohexane, n-butyl-4.4-bis(t-butylperoxy) valerate, 2.2-bis(t-butylperoxy)-butane, t-butyl hydroperoxide, cumene hydroperoxide, di-isopropyl benzene hydroperoxide, p-menthane hydroperoxide, 2.5-dimethylhexane 2.5-di-hydroperoxide, 1.1.3.3-tetramethylbutyl hydroperoxide, di-t-butyl peroxide, t-butylcumyl peroxide, di-cumyl peroxide, ,'-bis(t-butyl peroxyisopropyl)benzene, 2.5-dimethyl-2.5-di(t-butyl peroxy)hexane, 2.5-dimethyl-2.5-di(t-butyl peroxy) hexane-3, acetyl peroxide, t-butyl peroxy acetate, t-butyl peroxy isobutylate, t-butyl peroxy 2-ethyl hexanoate, t-butyl peroxy 3.5.5-trimethyl hexanoate, t-butyl peroxy laurate, t-butyl peroxy benzoate, di-t-butyl diperoxy isophthalate, 2.5-dimethyl-2.5-di(benzoyl peroxy)hexane, t-butyl peroxy maleic acid, t-butyl peroxyisopropyl carbonate. One or more than two of the above compounds may be used.

At least one of monomers selected from styrene, alkyl styrenes such as methyl styrene, ethylstyrene, isopropyl styrene, halogenated styrene such as chloro styrene, bromostyrene, or halogenated alkyl styrene is used as the styrene monomer in the present invention. In supplying the styrene monomer, it may be substituted in part with a monomer which can be radical-polymerized with styrene monomer. Examples of such monomers are acrylonitrile, methacrylonitrile, vinylidene cyanide, acrylic acid and alkyl esters of acrylic acid.

Examples of the butadiene polymer used in the present invention are polybutadiene rubber manufactured by the emulsion polymerization method, and polybutadiene rubber manufactured by the solution polymerization method using stereospecific catalyst or organic lithium catalyst. When using such a polybutadiene polymer, a portion thereof may be substituted by isoprene polymer or styrenebutadiene copolymer rubber.

In the method of the present invention, such solvents as ethylbenzene, ethyltoluene, toluene, xylene, ethylxylene, diethylbenzene may be supplied to the polymerization vessel. Although there is no specific limit set on the amount of such a solvent, it is preferred that the amount should not exceed 50 parts by weight for 100 parts by weight of total styrene monomer supplied to the polymerization reactor. This is because the solution decreases the polymerization volume and because recovery of solution is rather labor consuming.

In the method of the present invention, it is necessary to polymerize a styrene monomer throughout the two steps of (A) and (B). The advantages of the present invention are not achieved by step (A) or (B) alone. This is because of the fact that the present invention manifests its advantages by reacting an organic peroxide with a butadiene polymer in a specific state.

There are no limitations to be placed on the type or the structure of the single or plural number of reactors connected in series and used in the step (B) of the present invention. They may be agitator type reactor (reactor with agitator), or the column type reactor.

In the present invention method, fluidizing agent such as paraffin, various types of antioxidants, or molecular weight regulator such as mercaptan may be added to the polymerization reactors.

Rubber modified polystyrene resin obtained by the present invention may be used singly, or in combination with other styrene resins depending on the uses. The resin obtained by the present invention may be used in combination with stabilizers generally used with styrene resins against the heat, light, and oxygen, flame retarding agents, plasticizers, coloring agents, lubricants, and antistatic agents.

The present invention method remarkably improves the impact resistance of the portions where polystyrene molecule orientation is likely to occur in the molded product made from rubber modified styrene resin manufactured in accordance with the present invention. This is not at all anticipated from the conventional arts, and its industrial utility value is extremely valuable.

The examples of the present invention are now given:

EXAMPLE 1 a. Method of Manufacture

Polymerization was conducted using an agitator type polymerization apparatus comprising serially connected three stage polymerization reactors. To the polymerization reactor of the 1st step (Step (A) of the present invention) was continuously supplied 108 parts by weight per unit time of butadiene polymer solution made up by dissolving 8 parts by weights of butadiene polymer (Dien 55 available from Asahi Chemical Industry Co., Ltd.) in 100 parts by weight of styrene, and to the polymerization reactor of the 2nd stage (Step (B) of the present invention) were continuously supplied 45 parts by weight of styrene, 20 parts by weight of ethylbenzene, and 0.07 parts by weight of di-t-butyl peroxide. The polymerization temperature for each of the polymerization reactor in the stages 1 to 3 was set at 140° C., 130° C. and 133° C. respectively. Polymerization liquid from the polymerization reactor in the 3rd stage was introduced to a volatile matter removing device to remove unreacted monomer and ethylbenzene. The device was operated at a temperature of 220° C. and at a degree of vacuum of 20 torr. The polymerization yield of styrene monomer in the polymerization reactor in the 1st stage was 21%, while overall polymerization yield in the three stages was 81%.

Accordingly, the rubber content of the product resin was 6.4%. In the following examples, the volatile matter removal was conducted under the identical conditions as those of the present example.

b. Molding and Evaluation

Molding was conducted in the following manner. Using an injection molder, a dumb-bell test piece was molded at the molding temperature of 210° C. The dimensions were; length 21.5 cm, thickness 0.32 cm, widths 2 cm at both ends and 1.3 cm at the center. The gate portion for the mold dies was the end portions and the diameter of the gate was 0.2 cm. At the same time, notched Izod test piece was also molded. Evaluation of impact strength by the falling weight test at the portions where polystyrene orientation tended to occur was conducted in the following manner.

In order to seek out the portions where polystyrene molecule orientation tends to occur in the said dumb-bell test piece, polystyrene resin with molecular weight of 130,000 was molded under the same conditions as mentioned above as a standard product. The test piece taken from such a product was heated at 90° C. for 6.5 hours, and the contraction ratios of various portions of the molded product were sought. At the end of the dumb-bell test piece which is not the gate portion, the contraction in the direction of the length was 1% while it was 9% at the center. The contraction ratio at the center was extremely high suggesting that the center portion is where the polystyrene molecule orientation tended to occur most. Thus, by evaluation of the impact strength by the falling weight test at the center, the advantages of the present invention become apparent. Measurement of the falling weight impact strength was performed by dropping vertically a metallic weight at the center of the dumb-bell test piece placed horizontally, and by gradually increasing the height from which the weight is dropped, the height at which the test piece cracks is sought, and the sum of thus obtained height and the weight of the metallic weight was used in evaluating the impact strength. For evaluating the general impact strength of the resin Izod impact value was measured in a method similar to that of ASTM-D-256. The results are shown in Table 1. Excellent effects of the present invention are clearly observed.

EXAMPLE 2

A polymerization apparatus of a similar type as that of Example 1 was used, and 100 parts by weight per unit time of styrene was supplied to the 1st polymerization vessel while 10 parts by weight of butadiene polymer was supplied to the 1st polymerization vessel. To the 2nd polymerization vessel were supplied per unit time 80 parts by weight of styrene, 30 parts by weight of ethylbenzene, and 0.2 parts by weight of 2.5-dimethyl-2.5-di(t-butyl peroxy)hexane, and the polymerization temperature of the first to the third tanks was set at 135° C., 130° C. and 135° C. respectively. The polymerization yield of styrene monomer in the 1st stage was 29%, while overall polymerization yield in the three stages was 84%. The rubber content of the product resin was 6.2%. The impact strength was measured similarly as in Example 1. Table 1 shows the results thereof.

EXAMPLE 3

A polymerization apparatus of a similar type as that of example 1 was used, and for 100 parts by weight per unit time of styrene supplied to the 1st polymerization vessel, 5 parts by weight of butadiene polymer was supplied to the 1st polymerization vessel, 20 parts by weight of styrene, 10 parts by weight of ethylbenzene, and 0.03 parts by weight of 2.5-dimethyl-2.5-di(benzoyl peroxy)hexane were supplied to the 2nd polymerization vessel. The polymerization temperature of the 1st to the 3rd vessels was set at 132° C., 135° C., and 135° C. respectively. The polymerization yield of styrene in the vessel in the 1st stage was 19% while overall polymerization yield in three stages was 60%. The rubber content of the product resin was 6.0%. The impact strength was measured similarly as in Example 1. Table 1 shows the results thereof.

EXAMPLE 4

Polymerization was conducted using an agitator type polymerization apparatus comprising a continuous series of 4 stage polymerization vessels. To the polymerization vessel in the 1st stage were continuously supplied 100 parts by weight per unit time of styrene, 7 parts by weight of butadiene polymer, and 0.003 parts by weight of 2.5-dimethyl-2.5-di(t-butyl peroxy)hexane. To the polymerization vessel of the third stage were supplied 10 parts by weight per unit time of styrene, 13 parts by weight of ethylbenzene, and 0.05 parts by weight of 2.5-dimethyl-2.5-di(t-butyl peroxy)hexane. The polymerization temperature of the 1st to the 4th polymerization vessels was set at 132° C., 132° C., 134° C. and 140° C. respectively. The polymerization yield of styrene monomer in the polymerization vessel in the 2nd stage was 16%, while overall polymerization yield was 93%. The rubber content in the product resin was 6.4%. The evaluation similar to Example 1 was performed and the results are shown in Table 1.

EXAMPLE 5

Polymerization was conducted in a polymerization apparatus comprising two stage agitator type reaction vessels and a column reactor in the 3rd stage connected in series. To the reaction vessel in the 1st stage was continuously supplied 107 parts by weight per unit time of butadiene polymer solution in which 7 parts by weight of butadiene polymer for 100 parts by weight of styrene was dissolved. To the column reactor in the 3rd stage were supplied 20 parts by weight of per unit time of styrene, 20 parts by weight of ethylbenzene, and 0.05 parts by weight of 2.5-dimethyl-2.5-di(benzoyl peroxy)hexane. The temperature of the 1st and the 2nd polymerization vessels was set at 136° C., and the polymerization temperature at the outlet of the third polymerization vessel at 160° C. The polymerization yield of styrene monomer at the 2nd reactor was 25% while overall polymerization yield in three stages was 90%. The rubber content in the product resin was 6.1%. The impact strength was measured similarly as in Example 1 and the results are shown in Table 1.

COMPARATIVE EXAMPLE 1

A polymerization apparatus of the similar construction as that of Example 1 was used, and the conditions identical to those of Example 1 were followed for supplying the starting material to the apparatus except that organic peroxide was not supplied to the 2nd polymerization vessel. The reaction temperature of the 1st to the 3rd polymerization vessels was set at 140° C., 142° C. and 142° C. respectively. The polymerization yield of styrene in the 1st polymerization vessel was 19% while overall polymerization yield in three stages was 78%. Accordingly, the rubber content in the product resin was 6.6%. The impact strength determined similarly to Example 1 is shown in Table 1.

COMPARATIVE EXAMPLE 2

A polymerization apparatus of the similar construction as of Example 1 was used, and the conditions identical to those of Example 2 were followed for supplying the starting material except that 2.5-dimethyl-2.5-di(t-butyl peroxide)hexane was not supplied to the 2nd polymerization tank, and 0.15 parts by weight of the same substance was supplied to the 1st polymerization vessel. The reaction temperature at the 1st to 3rd polymerization vessels was set at 130° C., 136° C. and 137° C. respectively. The polymerization yield of styrene in the 1st stage was 24%, while overall polymerization yield in three stages was 81%. Accordingly, the rubber content of the product resin was 6.4%.

The impact strength was measured in a manner similar to that of Example 1, and the results are shown in Table 1.

COMPARATIVE EXAMPLE 3

The polymerization apparatus with an identical construction as that of Example 1 was used, and the raw materials were supplied under the conditions identical to those of Example 3. The polymerization temperature of the 1st to the 3rd polymerization vessels was set at 138° C., 130° C. and 130° C. respectively. The polymerization yield of styrene in the 1st polymerization vessel was 29% while overall polymerization yield in three stages was 60%. The rubber content in the product resin was 6.5%. The impact strength was measured similarly as in Example 1 and the results are shown in Table 1.

COMPARATIVE EXAMPLE 4

A polymerization vessel of the similar construction as Example 1 was used, and the polymer starting materials were supplied under the conditions identical to those of Example 1 except that the amount of di(t-butyl peroxide) supplied to the 2nd polymerization vessel was changed to 1.0 parts by weight per unit time for 100 parts by weight of styrene supplied per unit time to the polymerization vessel in the 1st stage. The reaction temperature at the 1st to the 3rd polymerization vessels was set at 140° C., 130° C. and 125° C. respectively. The polymerization yield of styrene in the 1st polymerization vessel was 21% while overall polymerization yield in three stages was 78%. The rubber content of the product resin was 6.6%. The impact strength was measured in a manner similar to that of Example 1, and the results are shown in Table 1.

TABLE 1

Impact Strength Evaluated by Falling Weight Test of Rubber Modified Styrene Resin where Orientation of Styrene Resin is Likely to Occur

| | Organic Peroxide Addition *1 (parts by weight) | | Polymerization Yield in Step A *2 (Times) | Polymerization Yield in Step B *3 (Times) | Rubber Content (%) | Izod Test Impact Strength kg · cm/cm | Impact Strength Evaluated by Falling Weight kg · cm |
|---|---|---|---|---|---|---|---|
| | Step A | Step B | | | | | |
| Example 1 | — | 0.07 | 2.63 | 4.59 | 6.4 | 8.9 | 19.5 |
| Example 2 | — | 0.2 | 2.90 | 4.21 | 6.2 | 9.5 | 21.4 |
| Example 3 | — | 0.03 | 3.80 | 2.79 | 6.5 | 9.2 | 20.3 |
| Example 4 | 0.003 | 0.05 | 2.29 | 5.39 | 6.4 | 9.4 | 18.5 |
| Example 5 | — | 0.05 | 3.57 | 3.32 | 6.1 | 9.1 | 24.0 |
| Comparative Example 1 | — | — | 2.38 | 4.95 | 6.6 | 8.9 | 11.0 |
| Comparative Example 2 | 0.15 | — | 2.40 | 5.08 | 6.4 | 9.4 | 9.8 |
| Comparative Example 3 | — | 0.03 | 5.80 | 1.48 | 6.5 | 9.0 | 9.6 |
| Comparative Example 4 | — | 1.0 | 2.63 | 4.38 | 6.6 | 5.2 | 4.5 |

*1 Amount of styrene momomer supplied to the 1st vessel of Step A is set as 100 parts by weight.

*2 $\frac{\text{Polymerization yield of styrene monomer in the final vessel of Step A}}{\text{Weight of butadiene polymer in the final vessel of Step A}}$

*3 $\frac{\text{Polymerization yield of styrene monomer in Step B}}{\text{Polymerization yield of styrene monomer in Step A}}$

We claim:

1. In a method of continuously manufacturing rubber modified styrene resins from a styrene monomer and a butadiene polymer by bulk polymerization or solution polymerization using an organic peroxide as an initiator of radical polymerization, the improvement comprising:

(A) a first step of using a single or a plural number of agitator type polymerization vessels connected in series, continuously supplying 100 parts by weight of the styrene monomer and 3 to 15 parts by weight of the butadiene polymer per unit time to the first polymerization vessel, feeding continuously 0 to 0.003 parts by weight of the organic peroxide per said unit of time to the first vessel in full amount or to a plurality of polymerization vessels in divided portions, and conducting polymerization until the polymerization yield of the styrene monomer in the final polymerization vessel becomes 2 to 5 times more than the weight of the butadiene polymer; and (B) a second step of continuously feeding to the first stage of a single or plural number of reactors connected in series the full amount of polymerization liquid discharged from the first step, 0 to 200 parts by weight of fresh styrene monomer per said unit of time, and 0.01 to 0.2 parts by weight of fresh organic peroxide per said unit of time, and conducting polymerization until the polymerization yield of the styrene monomer in the final stage is at least 1.5 times the yield in the first step.

2. A method as claimed in claim 1 wherein the polymerization yield of the styrene monomer in the final polymerization stage in said first step is 2.3 to 3.5 times more than the weight of the butadiene polymer.

3. A method as claimed in claim 1 wherein the amount of styrene monomer freshly fed in the second step is 0 to 150 parts by weight.

4. A method as claimed in claim 1 wherein the polymerization yield of the styrene monomer in the final stage of said second step is more 2 times than the yield in said first step.

5. A method as claimed in claim 1 wherein the reactor used in the second step is a column type reactor.

6. A method as claimed in claim 1 wherein said styrene monomer is styrene, an alkyl styrene, a halogenated styrene or a halogenated alkyl styrene.

7. A method as claimed in claim 6 wherein said styrene monomer is in part substituted with a monomer radical-copolymerizable with said styrene monomer.

8. A method as claimed in claim 7 wherein said monomer radical-copolymerizable with the styrene monomer is acrylonitrile, methacrylonitrile, vinylidene cyanide, or an alkyl ester of acrylic acid or methacrylic acid.

9. A method as claimed in claim 1 wherein said butadiene polymer is a polybutadiene rubber prepared by an emulsion polymerization process or a solution polymerization process using a stereospecific catalyst or an organic lithium catalyst.

10. A method as claimed in claim 9 wherein said butadiene polymer is substituted in part by isoprene polymer or styrene-butadiene copolymer rubber.

* * * * *